United States Patent
Wu et al.

[11] Patent Number: 6,107,240
[45] Date of Patent: Aug. 22, 2000

[54] CATALYST COMPOSITION CONTAINING AN INTIMATELY MIXED OXIDE OF CERIUM AND PRASEODYMIUM

[75] Inventors: Joseph Hui-Zhao Wu; Chung-Zong Wan, both of Somerset, N.J.

[73] Assignee: Engelhard Corporation, Iselin, N.J.

[21] Appl. No.: 08/824,425

[22] Filed: Mar. 26, 1997

[51] Int. Cl.$^7$ ............................ B01J 23/10; B01J 23/40; B01J 23/42

[52] U.S. Cl. ..................... 502/304; 502/302; 502/325; 502/334; 502/339

[58] Field of Search ................... 502/302, 304, 502/325, 334, 339

[56] References Cited

U.S. PATENT DOCUMENTS

| | | | |
|---|---|---|---|
| 4,714,694 | 12/1987 | Wan et al. | 502/304 |
| 5,057,483 | 10/1991 | Wan | 502/304 |
| 5,075,276 | 12/1991 | Ozawa et al. | 502/304 |
| 5,212,142 | 5/1993 | Dettling | 502/304 |
| 5,248,650 | 9/1993 | Sekiba et al. | 502/303 |
| 5,556,825 | 9/1996 | Shelef et al. | 502/303 |

FOREIGN PATENT DOCUMENTS

| | | | |
|---|---|---|---|
| 0 786 284 A1 | 7/1997 | European Pat. Off. | B01D 53/94 |
| 0 824 955 A1 | 2/1998 | European Pat. Off. | B01D 53/94 |
| 197 13 103 A1 | 10/1997 | Germany | B01J 23/63 |
| 62-282640 | 8/1987 | Japan | B01J 23/56 |
| 63-240947 | 6/1988 | Japan | B01J 23/56 |
| WO 93/15834 | 8/1993 | WIPO | B01J 23/10 |

OTHER PUBLICATIONS

J.A. Jones et al; Sorption Cooler Technology Development at JPL; Cryogenics; 1990; vol. 30; Mar.; p. 239.

*Primary Examiner*—Steven Bos
*Assistant Examiner*—Alexander G. Ghyka

[57] ABSTRACT

A catalyst suitable for the treatment of automotive engine exhaust exhibiting enhanced oxygen storage capacity. The catalyst composition contains, in addition to a catalytic material such as one or more of platinum, rhodium and palladium dispersed on an activated alumina support, an oxygen storage component ("OSC") which is an intimately mixed oxide of ceria and praseodymia having a Pr:Ce atomic ratio in the range of about 2:100 to 100:100 and optionally containing one or more other rare earth metal oxides. The OSC is segregated from the catalytic material and may optionally have dispersed thereon a limited amount of a second catalytic metal component, such as platinum, rhodium and/or palladium. The intimately mixed oxide may be formed by co-precipitation by impregnation of bulk ceria particles with a praseodymium precursor, or any other method to form an intimately mixed oxide. The OSC may comprise at least about 5% by weight of the combined weight of the OSC and the catalytic component.

24 Claims, 1 Drawing Sheet

CATALYST COMPOSITION CONTAINING AN INTIMATELY MIXED OXIDE OF CERIUM AND PRASEODYMIUM

BACKGROUND OF THE INVENTION

1. Field of the Invention

The present invention is broadly concerned with catalysts for the abatement of pollutants, especially the abatement of $NO_x$, HC and CO, particularly with their abatement in the exhaust gas of internal combustion engines. More specifically, the present invention is concerned with a novel composition which comprises a catalytic component and an oxygen storage component comprising an intimately mixed oxide of cerium and praseodymium.

2. Related Art

It is well-known in the art to utilize catalyst compositions, such as oxidation catalysts and those commonly referred to as three-way conversion catalysts ("TWC catalysts") to treat the exhaust gases of internal combustion engines. Oxidation catalysts promote the oxidation of unburned hydrocarbons ("HC") and carbon monoxide ("CO") in engine exhaust to $H_2O$ and $CO_2$. TWC catalysts promote such oxidation reactions as well as the substantially simultaneous reduction to $N_2$ of nitrogen oxides ("$NO_x$") in the exhaust. It is well-known that successful functioning of the TWC catalyst to promote oxidation of HC and CO and substantially simultaneous reduction of $NO_x$ requires that the engine be operated at or close to stoichiometric air/fuel conditions.

It is also well-known in the art to provide such catalysts in the form of a refractory support material, such as a refractory metal oxide, e.g., activated alumina, on which is dispersed a catalytic metal component such as one or more platinum group metal components. The refractory metal oxide preferably has a high surface area to enhance the effectiveness of the catalytic metal component dispersed thereon. The catalytic component provided by the refractory support material having the catalytic metal component dispersed thereon is normally provided as a thin coating or "washcoat" adhered to the walls of a refractory substrate. The latter often takes the form of a body made from a suitable material such as cordierite, mullite or the like, which is formed to have a plurality of parallel, fine gas flow passages extending therethrough. Typically, there may be from about 150 to 450 or more such gas flow passages per square inch of end face area of the substrate.

A typical TWC catalyst will comprise one or more platinum group metals, typically including palladium, or palladium plus rhodium, or platinum plus rhodium, or platinum plus rhodium plus palladium, dispersed on an activated alumina to provide a washcoat coated on the gas flow passage walls of a suitable substrate. Optionally, a catalytic base metal component such as a transition metal of Group VIII of the Periodic Table of Elements, e.g., iron, nickel, manganese or cobalt, may be included in the composition.

Bulk ceria is known to be a useful additive for such catalyst compositions, especially TWC compositions in which the bulk ceria is believed to serve as an oxygen reservoir and is sometimes referred to as an oxygen storage component. It is believed that, with the engine operating at air-to-fuel ratios which fluctuate slightly above and below stoichiometric, the ceria supplies additional oxygen for the oxidation reaction during rich (relatively oxygen-deficient) periods of operation and takes up oxygen during lean (relatively oxygen-rich) periods of operation. Bulk ceria is not, however, immune to the problem of thermal degradation which affects other refractory metal oxides such as activated alumina. At elevated temperatures both activated alumina and bulk ceria suffer a reduction in their surface areas and this significantly reduces the effectiveness of the catalyst. It is known to stabilize refractory metal oxides such as alumina and ceria against such thermal degradation. One known technique is to impregnate into bulk alumina a solution of a soluble rare earth metal salt, e.g., a cerium salt such as cerium nitrate, and then calcine the impregnated alumina to provide a ceria-impregnated alumina to stabilize the alumina against thermal degradation. It is similarly known to stabilize bulk ceria against thermal degradation by impregnating it with a solution of a soluble aluminum salt such as aluminum nitrate, followed by calcination to provide an alumina-impregnated bulk ceria. While such impregnation techniques are effective to reduce the effects of thermal degradation, ceria is, nonetheless, subjected to degradation and marked reduction of the efficiency of the catalyst of which it is a part, not only by thermal degradation but also by poisoning of the catalyst by sulfur compounds, such as sulfur oxides which are engendered in the exhaust being treated from sulfur compounds contained in the fuel being burned.

U.S. Pat. No. 5,075,276, issued Dec. 24, 1991 to M. Ozawa et al, discloses a catalyst containing ceria as an oxygen storage component which is said to be useful for purification of exhaust gases. The Ozawa et al catalyst comprises a support substrate on which is disposed a washcoat comprising (a) a high surface area material which may be alumina or titanium oxide, (b) cerium oxide, (c) zirconium oxide and (d) at least one oxide of a rare earth element other than cerium and lanthanum. Ozawa et al's preferred atomic ratios per 100 cerium atoms are from 5 to 100 zirconium atoms and from 5 to 150 rare earth element atoms. Noble metals such as platinum, palladium, rhodium, etc., and base metals such as chromium, nickel, vanadium, copper, cobalt, manganese, etc., are exemplified as catalytic metals to be utilized on the Ozawa et al TWC catalysts (column 3, line 58 et seq.). Fifteen rare earth metals—including praseodymium—are listed at column 3, lines 33–43 as being suitable for item (d), although only yttrium, ytterbium, samarium and neodymium are exemplified. The Ozawa et al composition is said to suppress thermal degradation of the oxygen storage component (column 2, lines 5–9) which would otherwise occur unchecked, because of normal degradation of the ceria and consequent loss of surface area (column 1, lines 22–45).

Ozawa et al discusses the preparation of a composite oxide and/or a solid solution of (1) the oxide of the rare earth element other than cerium and lanthanum with (2) the cerium oxide, the zirconium oxide, or both. The composite oxide or solid solution is said to be obtained by either of two methods. One (column 3, line 65 et seq.) is by impregnating the catalyst layer (e.g., platinum on alumina) with three solutions of, respectively, a cerium salt, a zirconium salt and a salt of the rare earth metal, and then "burning" the impregnated catalyst layer at 600° C. or higher. The other method (column 4, line 5 et seq.) comprises mixing the three oxide powders with alumina and "burning" the mixture at 800° C. or higher. At column 4, line 12 et seq., Ozawa et al discloses that the cerium oxide and zirconium oxide may be present in the catalyst layer or may be loaded on the surface of the catalyst layer. The latter approach is said to improve the "catalyst property" remarkably.

SUMMARY OF THE INVENTION

The present invention provides a ceria and praseodymia-containing catalyst composition which remarkably improves the oxygen storage capacity of an otherwise identical composition containing ceria alone. The composition contains, in addition to a catalytic material comprising a first catalytic metal component, an intimate combination of ceria and praseodymia. For example, ceria may be co-formed with praseodymia or bulk ceria may be impregnated by a solution of a praseodymium salt and then heated to provide a praseodymia-impregnated ceria. There may optionally be a limited amount of a second catalytic metal component dispersed on the combined ceria-praseodymia. The resulting catalyst composition of the present invention does not exhibit particular improvement in surface area stability relative to known catalysts containing stabilized ceria. However, the catalysts of the present invention exhibit remarkable improvement over known catalysts with respect to total oxygen storage capacity after high temperature aging, even in the presence of sulfur compounds, e.g., sulfur dioxide.

In accordance with the present invention there is provided a catalyst member comprising a substrate on which is disposed (a) a catalytic material comprised of a refractory support material having a catalytically effective amount of a first catalytic metal component dispersed thereon, e.g., a first platinum group metal component, and (b) an oxygen storage component which is segregated from the first catalytic metal component. The oxygen storage component comprises an intimately mixed oxide of cerium and praseodymium having an atomic ratio of Pr:Ce in the range of about 2:100 to 100:100 and having from zero to not more than about 10% by weight of a second catalytic metal dispersed thereon. (The % by weight is based on the sum of the weight of the intimately mixed oxide of cerium and praseodymium plus the weight of the second catalytic metal.)

In one aspect of the invention the intimately mixed oxide may comprise one or more of a) praseodymia-impregnated bulk ceria, which may have an atomic ratio of Pr:Ce in the range of from about 2:100 to 15:100 and b) one or more of a co-formed mixed oxide and a sintered mixed oxide. Optionally, the intimately mixed oxide may have, for example, an atomic ratio of Pr:Ce in the range of about 15:100 to 100:100.

In another aspect of the invention, the second catalytic metal component may optionally comprise a second platinum group metal component dispersed on the oxygen storage component. The second catalytic metal component may be either identical to or different from the first catalytic metal component.

Other aspects of the present invention provide, either alone or in combination, the following features: the oxygen storage component may comprise at least about 5% by weight of the combined weight of the oxygen storage component and the catalytic component; the oxygen storage component may optionally further comprise one or more oxides of rare earth elements other than cerium and praseodymium; and the first platinum group metal component may be selected from the group consisting of one or more of platinum, palladium and rhodium components.

Still another aspect of the present invention provides that the oxygen storage component may be present in an amount of at least about 10% by weight (exclusive of the weight of any second catalytic metal component dispersed on the oxygen storage component) of the combined weight of the catalytic component and the oxygen storage component.

The present invention also provides for the intimately mixed oxide oxygen storage component to further comprise one or more additional rare earth metal oxides, e.g., neodymia, the additional rare earth metal oxides comprising not more than about 20% by weight of the intimately mixed oxide.

As used herein and in the claims, the following terms and grammatical variations thereof shall have the indicated meanings.

Reference to a "catalytic metal component" means a catalytic metal present in any suitable form, whether as an oxide or other compound, as the elemental metal, or as an alloy with one or more other metals. The term "platinum group metal" means and includes the metals platinum, palladium, rhodium, ruthenium, osmium and iridium.

The term "intimately mixed oxide" shall mean an intimate combination of ceria, praseodymia and, optionally, one or more other rare earth metal oxides, such as neodymia, attained by any suitable method which provides more than a mere physical admixture of ceria particles and praseodymia particles. Mere physical admixtures are excluded from the defined term; however, a true chemical compound between ceria and praseodymia is not required and an intimately mixed oxide may be attained by impregnating one of ceria and/or praseodymia into the other, co-forming the ceria and praseodymia, or sintering the ceria and praseodymia together. In each case, one or more of the optional rare earth metal oxides may also be included in the intimately mixed oxide.

The term "bulk" used with reference to ceria, alumina or another component of the catalyst composition means that the ceria, alumina or other component is present as fine discrete particles. The term is intended to distinguish from the situation in which a component is "dispersed" onto or "impregnated" into another material.

Reference to a component such as praseodymia being "dispersed" onto or "impregnated" into a bulk material, such as bulk ceria, means that a precursor of the praseodymia, such as a soluble praseodymium salt, for example, praseodymium nitrate, has been dissolved or otherwise dispersed in a liquid vehicle into which the bulk material is placed to disperse the precursor onto the particles of the bulk material. This step is followed by calcination or other treatment of the bulk material to convert the dispersed precursor to the oxide and affix it on the surface of, or within the surface layers of, the bulk material.

The term "co-formed" used with respect to an intimately mixed oxide means that the two or more oxides are dispersed substantially throughout the entire matrix of the intimately mixed oxides as will occur, for example, when the respective oxides or precursors thereof are co-precipitated or co-gelled. The defined term is intended to distinguish from a material being "impregnated" into or "dispersed" on another material.

The term "sintering" used with respect to an intimately mixed oxide means that the two or more precursor oxides are heated together at a temperature sufficiently high and for a period long enough that the resulting product differs chemically or physically from a mere physical admixture of the oxides.

The term "activated alumina" means a relatively high BET surface area alumina comprised predominantly of gamma-alumina, although other phases, especially eta and delta, may be present in minor proportions.

The term "segregated" used with regard to the oxygen storage component being segregated from the first catalytic metal component, means that the oxygen storage component particles are not dispersed on the refractory support material on which the first catalytic metal is dispersed, and the first catalytic metal component is not dispersed on the oxygen storage component particles. The first catalytic metal component is dispersed on another refractory support material, normally a metal oxide, e.g., activated alumina particles. The refractory support particles having the first catalytic metal component dispersed thereon may, however, (1) be admixed with the oxygen storage component particles or (2) may be present in the catalyst member in a separate, discrete layer disposed on or under a layer of the oxygen storage component. In either case (1) or (2) the oxygen storage component is deemed to be "segregated" from the first catalytic metal component.

Other aspects of the present invention will be apparent from the following description.

BRIEF DESCRIPTION OF THE DRAWING

The sole FIGURE is a plot showing the conversion of CO and NO contained in a gaseous stream by catalysts containing intimately mixed oxides having varying atomic proportions of praseodymium and cerium.

DETAILED DESCRIPTION OF THE INVENTION AND SPECIFIC EMBODIMENTS THEREOF

Figure 1:
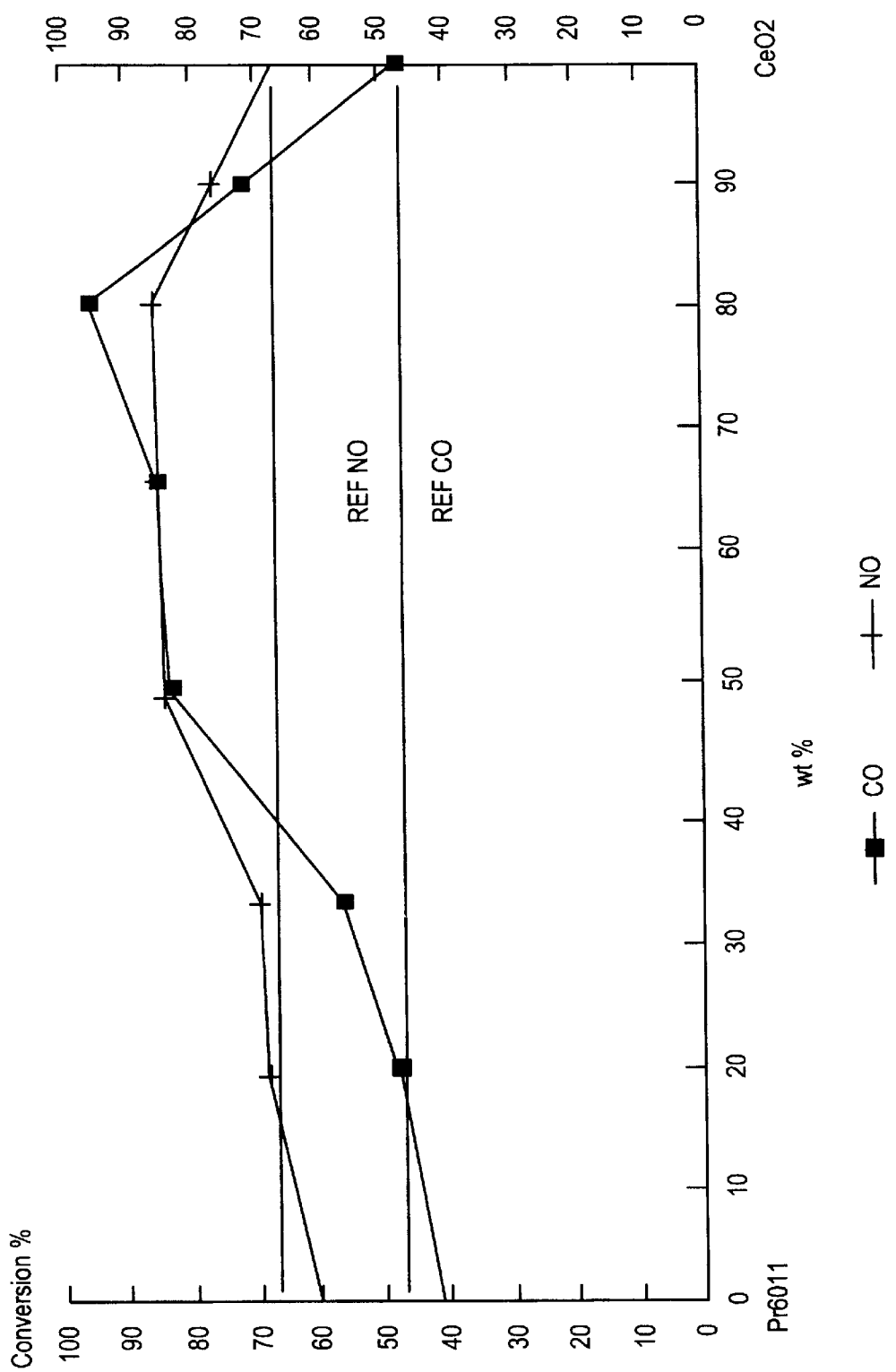

An oxygen storage component ("OSC") in a catalyst composition helps to selectively convert CO to $CO_2$ and $NO_x$ to $N_2$. Ceria is currently the most widely used OSC in catalysts used to treat automobile engine exhausts. The use of bulk ceria in intimate contact with a precious metal catalytic component is believed to facilitate the redox properties of the ceria at elevated temperatures (e.g., temperatures above 450° C.). However, as noted in Ozawa et al U.S. Pat. No. 5,075,276 discussed above, bulk ceria rapidly loses its surface area upon exposure to high temperature. This is especially so in a net reducing atmosphere, i.e., a fuel-rich atmosphere. If the ceria is dispersed onto an alumina support (one of the two preparation techniques taught by Ozawa et al), the impregnated ceria tends to interact strongly with the alumina support in a net reducing atmosphere to form a perovskite crystal structure, and to sinter drastically in a net oxidizing (fuel-poor, oxygen-rich) atmosphere. With loss of its surface area by any of the foregoing mechanisms (thermal degradation of bulk ceria, perovskite formation or sintering of dispersed ceria), the ceria becomes a dramatically less effective OSC after prolonged aging. In addition, the ceria component is very sensitive to sulfur oxide, e.g., $SO_2$, poisoning. Even prolonged exposure to a sulfur-containing atmosphere at relatively low temperatures (below 500° C.) can completely destroy the OSC function of ceria.

The present invention provides an OSC comprising an intimately-combined mixed oxide of ceria and praseodymia which is combined in a catalyst member with a catalytic material including a first catalytic metal component from which the intimately mixed oxide is segregated. The intimately mixed oxide may be free of platinum group metal components or, preferably, contains some platinum group metal components.

It has been found that neither ceria alone nor praseodymia alone possesses a significant OSC capacity after aging, but that an intimately-combined mixed oxide of praseodymium and cerium significantly enhances OSC properties after aging. The intimate combination of ceria and praseodymia in the intimately mixed oxide is attained by any suitable method including co-forming the two oxides, or impregnating a praseodymia precursor into bulk ceria and calcining, or vice versa, or calcining mixed ceria and praseodymia precursors at an elevated temperature for a time sufficient to chemically and/or physically change the material which is calcined, or a combination thereof A praseodymium content in the range of from about 2 atomic percent to 50 atomic percent (i.e., a Pr:Ce atomic ratio in the range of about 2:100 to 100:100), of the total of praseodymium and cerium atoms in the praseodymia-ceria intimately mixed oxide has been found to be effective to enhance the OSC effect. This Pr:Ce atomic ratio can be attained either with a homogeneous intimately mixed oxide or admixtures of various types of intimately mixed oxides described herein.

Bulk Ceria

Bulk ceria useful for the present invention typically may comprise at least 90 weight percent $CeO_2$. The predominant impurity in commercially available bulk cerias comprises lanthana with lesser amounts of other rare earth metal oxides, including praseodymia in an amount of up to an atomic ratio of about one part of praseodymium per 100 parts of cerium as an impurity. Thus, a bulk ceria useful for the preparation of the intimately mixed oxide of cerium and praseodymium of the present invention may comprise praseodymia as an impurity. For typical automotive exhaust gas catalytic converters, the catalyst composition (catalyst material plus monolithic substrate) generally may comprise from about 0.5 to 4.0 grams per cubic inch of catalyst material. Desirably, it is preferred to provide from about 0.2 to about 3 grams per cubic inch of the modified ceria of the present invention in the finished catalyst composition. This would provide the intimately mixed oxide oxygen storage component of the present invention in an amount of at least 5 weight percent of the total catalyst material (oxygen storage component plus catalytic material).

Co-Forming to Form the Intimately Mixed Oxide

The combining of praseodymia and ceria to form the intimately mixed oxide may be attained by co-forming. Co-forming can be achieved by co-precipitation of any suitable soluble praseodymium and cerium salts or by any other suitable technique such as co-gelling or the like. Whatever co-forming technique is used should result in a product which contains one oxide, e.g., praseodymia, dispersed in the matrix of the other, e.g., ceria. Thus, in the finished co-formed product, one oxide is not merely dispersed on the surface of particles of the other, or only within a surface layer thereof, thereby leaving a substantial core of, e.g., the ceria matrix, without praseodymia dispersed therein. Salts of the praseodymium and cerium (and optionally, of other rare earth metals) used as precursors of the co-formed mixed oxides may include chlorides, sulfates, nitrates, acetates, etc. The co-precipitates may, after washing, be dried to remove water and then calcined in air at about 500° C. or higher to provide the co-formed mixed oxides.

Impregnation to Form the Intimately Mixed Oxide

Impregnation or dispersion of one of ceria and praseodymia into the other may also be utilized to form the intimately mixed oxide. Usually, a precursor of praseodymia will be impregnated into bulk ceria rather than vice-versa. This may be accomplished by any suitable technique, such as by contacting bulk ceria particles with a solution or other liquid suspension of a praseodymia precursor as noted above in discussing co-precipitation, for example, a solution of praseodymium nitrate. The soaked ceria particles are then dried and heated in air, usually at a temperature of about 500° C. or more, whereby the praseodymium nitrate is converted to praseodymia and is impregnated into the surface and perhaps to a modest depth below the surface of the ceria particles. If it is desired to have the optional additional rare earth metal oxide present, variations of this technique may be employed. For example, precursors of other rare earth metal oxides may be co-impregnated into the bulk ceria particles. Typically, a praseodymia-impregnated bulk ceria has an atomic ratio of Pr:Ce in the range of about 2:100 to 15:100.

Sintering to Form the Intimately Mixed Oxide

The intimately mixed oxides of the present invention can also be formed by sintering an admixture of precursor oxides, e.g., praseodymia and ceria, and, optionally, other rare earth metal oxide precursors. The precursors are thoroughly mixed to assure substantially uniform dispersion throughout the admixture, and then heated, preferably in air, at an elevated temperature, e.g., 500° C. or higher, for a time sufficient to change the chemical and/or physical nature of the admixed particles.

Solid Solution

Since most of the praseodymia-modified cerium oxides show an X-ray diffraction spectrum typical of a cubic cerium oxide structure, it appears that the mixed praseodymium and cerium oxides are solid solutions. It is to be noted that incorporation of praseodymia into the ceria does not appear to significantly retard the surface area thermal degradation of the intimately mixed oxide upon exposure to high temperatures, e.g., 450° C. to 800° C. Enhancement of the OSC capability of the intimately mixed oxides of the present invention is believed to primarily result from the unexpected synergism between ceria and praseodymia.

The following Examples illustrate the preparation and testing of specific embodiments of the invention.

EXAMPLE 1

Starting Materials

Chemicals and their quantities used in the preparation were as follows:
1. Cerium nitrate obtained from Alfa, 104.8 grams
2. A commercially available praseodymium nitrate solution (22.06% Pr), 37.35 grams.
3. Hydrogen peroxide (30%) obtained from J. T. Baker, 53 mls
4. Ammonium hydroxide (28%) obtained from Corco Chemical, 66 mls
5. Nitric acid ($HNO_3$) 17.5% solution, 20 mls Sample preparation A. A mixture of the hydrogen peroxide, ammonium hydroxide and 265 mls of distilled water was prepared, and denominated Solution A-1.

B. The cerium nitrate was added to 150 mls of distilled water under constant stirring until all the cerium nitrate was dissolved. The praseodymium nitrate was then added with stirring to form a nitrate solution. At this point, the solution had a pH of 3. Under constant stirring, Solution A-1 was gradually added to the nitrate solution at room temperature. The color began to turn brown, amorphous cerium and praseodymium hydroxides began to co-precipitate and the pH started to increase. The addition of Solution A-1 was stopped when the pH increased to 8.61. The slurry was under constant stirring for 3 hours. Then, the $HNO_3$ solution was added gradually to bring the pH to 6.25.

C. BET surface area of the mixed praseodymia-ceria material after calcination at 555° C. for 12 hours was 59.7 $m^2/g$. The powder was designated Powder E1 and contained 80.5 atomic percent cerium oxide plus 19.5 atomic percent praseodymium oxide. An X-ray diffraction ("XRD") analysis was carried out on the product and the spectrum was in agreement with that of a cubic cerium oxide.

EXAMPLE 2

Sample Preparation

A series of oxides containing one or both of cerium and praseodymium oxides was prepared essentially according to the procedures described in Example 1, except that for Powder E2-1 no praseodymium nitrate was used. The oxide powders are identified as follows:

| Powder E2-1 | 100% ceria |
|---|---|
| Powder E2-2 | 10 atomic percent praseodymium plus 90 atomic percent cerium intimately mixed oxide |
| Powder E2-3 | 33 atomic percent praseodymium plus 67 atomic percent cerium intimately mixed oxide |
| Powder E2-4 | 67 atomic percent praseodymium plus 33 atomic percent cerium intimately mixed oxide |
| Powder E2-5 | 81 atomic percent praseodymium plus 19 atomic percent cerium intimately mixed oxide |
| Powder E2-6 | 100% praseodymia |
| Powder E2-7 | 49.6 atomic percent praseodymium plus 50.4 atomic percent cerium intimately mixed oxide. |

EXAMPLE 3

Sample Preparation

A commercially available ceria powder (99% purity) was obtained and designated Powder C3. The BET surface area of the powder was 120 $m^2/g$. Twenty grams of the powder was placed in a beaker. In a separate beaker, a praseodymium nitrate solution containing the equivalent of 1.955 grams of $Pr_6O_{11}$ was prepared by dissolving praseodymium nitrate crystals in distilled water. The nitrate solution was slowly added to the ceria powder and thoroughly mixed. After drying at 100° C. for 5 hours and calcining at 500° C. for one hour, an intimately mixed oxide powder comprising a praseodymia-impregnated oxide comprising bulk ceria was obtained and designated Powder E3. Powder E3 contained 91.1 percent by weight cerium oxide and 8.9 percent by weight praseodymium oxide, which is equivalent to an atomic ratio of Pr:Ce of 10:100.

EXAMPLE 4

A commercially available ceria powder (95% purity, 100 $m^2$/gram BET surface area) was used in this study. The impurities in the ceria were 3.5% $La_2O_3$, 1.2% $Nd_2O_3$ and trace $Pr_6O_{11}$. Twenty grams each of the powder was modified with $Y_2O_3$, $La_2O_3$ and $Pr_6O_{11}$ individually following the same impregnation procedures described in Example 3, using the appropriate nitrate salt. The modified powders are identified as follows:

| Powder C4 | control cerium oxide |
|---|---|
| Powder C4-Y | modified with 9.0 percent by weight yttria |
| Powder C4-La | modified with 9.0 percent by weight lanthana |
| Powder C4-Nd | modified with 9.0 percent by weight neodymia |
| Powder E4-Pr | modified with 9.0 percent by weight praseodymia |

EXAMPLE 5

A physical mixture of bulk ceria (the same type as used in Example 4) and bulk praseodymia obtained from a commercially available source was prepared by thoroughly mixing 8 grams of the ceria powder and 2 grams of the praseodymia powder. The powder mixture had 90 $m^2/g$ BET surface area. The powder mixture was not formed into an intimately mixed oxide and was designated Powder C5.

EXAMPLE 6

Preparation of Ceria-Praseodymia-Neodymia Mixture

The sample preparation of the intimately mixed oxide was essentially the same as described in Example 1. Neodymium nitrate crystals from a commercial source were dissolved in the solution of cerium nitrate and praseodymium nitrate obtained in Part B of Example 1. After calcination at 550° C. for 20 hours, the BET surface area of the oxide powder was 52 $m^2/g$. The resulting mixed oxide powder contained 50.3 atomic percent cerium, 49.6 atomic percent praseodymium and 0.1 atomic percent neodymium. The powder sample was designated Powder E6.

EXAMPLE 7

A. A commercially available gamma-alumina powder having a BET surface area of 150 $m^2/g$ was impregnated with a Rh nitrate solution and then heated for 3 hours at 350° C. to provide a rhodium-containing powder comprising 0.578 percent by weight rhodium. A thirty gram portion of the rhodium-containing powder was further impregnated with an amine-solubilized platinum hydroxide solution to obtain a 3.68 percent by weight platinum loading. The platinum and rhodium-containing alumina was ballmilled with acetic acid and water to form a slurry which was designated Slurry A.

B. 1 gram of the oxide powders designated in each of Examples 3–5, was impregnated with an amine-solubilized platinum hydroxide solution to obtain a 0.3% by weight platinum loading on the powder. Each of the platinum-containing oxide powders was individually mixed with a quantity of Slurry A and an alumina binder to form individual combined slurries. Each combined slurry was dried and calcined at 450° C. to form a catalyst powder. Each catalyst powder sample contained 34 weight percent of platinum and rhodium-containing alumina, 49 weight percent rare earth mixed metal oxide and 17 weight percent alumina binder. These samples were designated by appending the letter S to the designation given in Examples 3–5 to the oxide powders used in preparation of the samples.

C. A reference control sample containing 34 weight percent alumina having platinum-rhodium dispersed thereon and 66 weight percent alumina binder was prepared by combining Slurry A and the alumina binder only. The comparative sample obtained from this powder was designated REF 5.

D. Each catalyst solid sample from parts B and C was crushed to powder and sieved to obtain catalyst test samples consisting of particles in the 240–400 micron (about 300 microns average) diameter size range. A 20 mg sample of each catalyst test sample was mixed with 80 mg of like-sized cordierite particles (300 microns diameter average particle size).

E. Each cordierite-containing sample obtained in part D was individually loaded into a laboratory Model Gas Reactor. The catalyst sample was aged at 1000° C. for 6 hours in a simulated exhaust gas mixture containing 20 volume parts per million ("upper") $SO_2$ and employing a perturbation of plus or minus 0.2 air/fuel ratio at 0.167 Hz at stoichiometric set point and 350,000 VHSV space velocity. The aged catalyst was then evaluated on the same reactor using similar exhaust gas mixture employing a plus or minus 0.1 air/fuel ratio perturbation. The average feed gas compositions at the evaluation conditions contained 0.57% CO, 0.19% $H_2$, 0.19% NO, 0.285% $O_2$, 20 vppm $SO_2$ (2 vppm $SO_2$ in the evaluation of TABLE III, below), and balance $N_2$. The powders described in Example 2 were tested as well.

The results of conversion efficiencies of CO and NO at 500° C. of the materials described in Example 2 are presented in the sole FIGURE wherein the percent conversion is plotted against the weight percents of ceria and praseodymia in the intimately mixed oxides. With reference to the FIGURE it is apparent that neither ceria alone nor praseodymia alone shows any significant oxygen storage capacity after aging, even with the platinum catalytic component in intimate contact with the oxide. Addition of praseodymium into the ceria lattice, however, significantly enhances the ceria against deterioration under the $SO_2$ aging conditions employed. It appears that an intimately cerium-praseodymium oxide containing 20% praseodymia exhibits the greatest enhancement of the OSC. Separate characterization of the intimately mixed oxide powders after thermal aging at 1000° C. reveals that incorporation of praseodymia into ceria does not increase thermal stability of the ceria. Because bulk ceria alone is quite sensitive to sulfur dioxide poisoning, it is surprising that the mixed praseodymium-cerium oxide contributes to the better OSC function even after aging.

Improvement of the OSC characteristic of ceria can also be achieved by surface doping of the ceria particles with praseodymium and/or by providing intimate contact with a limited amount, not more than about 10 weight percent of a platinum group metal catalytic component, e.g., platinum and rhodium. The OSC is segregated from other catalytic metal components of the catalyst composition, such as a platinum group metal component dispersed on a refractory metal oxide support, e.g., activated alumina. Thus, an originally inexpensive ceria powder, inferior as an oxygen storage component, turns into a ceria having a superior OSC function after modification of the ceria with praseodymium to form an intimately mixed oxide, and the addition of a limited amount of platinum, in accordance with one embodiment of the present invention. The enhanced performance of this embodiment of the present invention is clearly indicated by the data of TABLE I, which were obtained by testing as described in Example 7, part E.

TABLE I

CO and NO Conversion Efficiencies

| | | Conversion Percentage* | |
|---|---|---|---|
| Sample | OSC type | CO | NO |
| REF-5 | none | 42 | 68 |
| C3-S | bulk ceria | 42 | 65 |
| E3-S | 91.1% Ce; 8.9% Pr | 83 | 75 |

*Evaluated at 500° C. and 20 ppm $SO_2$ in the feed gas.

TABLE II

Comparisons of Various REO Modified Cerias

| | | Conversion Percentage* | |
|---|---|---|---|
| Sample | OSC type | CO | NO |
| C4-S | bulk ceria | 54 | 62 |
| C4-Y-S | 91% Ce; 9% Y | 55 | 64 |
| C4-La-S | 91% Ce; 9% La | 52 | 62 |
| C4-Nd-S | 91% Ce; 9% Nd | 53 | 62 |
| E4-Pr-S | 91% Ce; 9% Pr | 84 | 75 |

*Evaluated at 500° C. and 20 ppm $SO_2$ in the feed gas.

TABLE III

Effect of Praseodymia on Ceria

| Sample | OSC type | Conversion Percentage* | |
|---|---|---|---|
| | | CO | NO |
| REF-5 | none | 48 | 73 |
| C4-S | bulk ceria | 66 | 75 |
| C5-S | 80% Ce; 20% Pr[1] | 66 | 75 |
| E4-Pr-S | 91% Ce; 9% Pr[2] | 86 | 83 |

*Evaluated at 500° C. and 2 ppm $SO_2$ in the feed gas.
[1]mixed oxide powders
[2]impregnated The data of TABLE II illustrate the unexpected superior effect on conversion performance of praseodymia as a modifier for ceria relative to other rare earth oxide modifiers. TABLE III clearly reveals that C5-S, a sample containing a simple physical mixture of bulk ceria and bulk praseodymia, unlike the intimately mixed oxide obtained by the practices of the present invention, does not enhance the ceria OSC function against aging as do the intimately mixed oxides of the invention.

While the invention has been described with reference to particular embodiments thereof, it will be appreciated that the appended claims are not so detailed. For example, catalyst compositions employing the intimately mixed oxides of this invention may be useful in catalytic conversion systems other than the treatment of engine exhaust gases, generally, in any suitable applications wherein sulfur-resistant characteristics are important.

What is claimed is:

1. A catalyst member comprising a substrate on which is disposed (a) a catalytic material comprising a refractory support material having a catalytically effective amount of a first catalytic metal component dispersed thereon, and (b) an oxygen storage component segregated from the refractory support material having the first catalytic metal component thereon; the oxygen storage component comprising an intimately mixed oxide of cerium and praseodymium having an atomic ratio of Pr:Ce in the range of about 2:100 to 100:100 and having a catalytically effective amount of a platinum component dispersed thereon.

2. The catalyst member of claim 1 wherein the intimately mixed oxide is selected from the group consisting of a co-formed mixed oxide, a praseodymia-impregnated bulk ceria mixed oxide, a sintered mixed oxide and mixtures thereof.

3. The catalyst member of claim 2 comprising a praseodymia-impregnated bulk ceria mixed oxide having an atomic ratio of Pr:Ce in the range of about 2:100 to 15:100.

4. The catalyst member of claim 1, claim 2 or claim 3 wherein the oxygen storage component comprises at least about 5% by weight of the combined weight of the oxygen storage component and the catalytic material.

5. The catalyst member of claim 1 or claim 2 wherein the intimately mixed oxide has an atomic ratio of Pr:Ce in the range of about 15:100 to 100:100.

6. The catalyst member of claim 1, claim 2 or claim 3 wherein the oxygen storage component further comprises at least one additional rare earth metal oxide other than $CeO_2$ and $PrO_2$.

7. The catalyst member of claim 6 wherein the additional rare earth metal oxide comprises not more than about 20% by weight of the combined weight of the additional rare earth metal oxide and the oxygen storage component.

8. The catalyst member of claim 6 wherein the additional rare earth metal oxide comprises neodymia.

9. The catalyst member of claim 1, claim 2 or claim 3 wherein the first catalytic metal component comprises a platinum group metal component.

10. The catalyst member of claim 8 wherein the first platinum group metal component is selected from the group consisting of one or more of platinum, palladium and rhodium components.

11. A catalyst member comprising:

a catalytic component comprising a refractory metal oxide support material having dispersed thereon a catalytically effective amount of a first platinum group metal component;

an oxygen storage component segregated from the first platinum group metal component and present in an amount of at least about 5% by weight of the combined weight of the catalytic component and the oxygen storage component and comprising an intimately mixed oxide of cerium and praseodymium having an atomic ratio of Pr:Ce in the range of about 2:100 to 100:100, and having a catalytically effective amount of a platinum component dispersed thereon, the intimately mixed oxide being selected from the group consisting of (a) a co-formed mixed oxide comprising praseodymia and ceria, (b) a sintered mixture of ceria and praseodymia powders, and (c) a praseodymia-impregnated oxide comprising bulk ceria, the intimately mixed oxide being segregated from the refractory metal oxide support material; and a substrate on which the catalytic component and the oxygen storage component are disposed.

12. The catalyst member of claim 11 wherein the intimately mixed oxide further comprises one or more additional rare earth metal oxides, the additional rare earth metal oxides comprising not more than about 20% by weight of the intimately mixed oxide.

13. The catalyst member of claim 12 wherein the additional rare earth metal oxides comprises neodymia.

14. The catalyst member of claim 11, claim 12 or claim 13 wherein the first platinum group metal component is selected from the group consisting of one or more of platinum, palladium and rhodium components.

15. The catalyst member of claim 12 or claim 13 wherein the intimately mixed oxide has an atomic ratio of Pr:Ce in the range of about 15:100 to 100:100.

16. A catalyst member comprising a substrate on which is disposed (a) a first catalytic material comprising a catalytically effective amount of a first catalytic metal component dispersed on a refractory oxide support comprising alumina, and (b) an intimately mixed oxide of cerium and praseodymium segregated from alumina and having an atomic ratio of Pr:Ce in the range of about 2:100 to 100:100 and a catalytically effective amount of a platinum component dispersed thereon.

17. The catalyst member of claim 16 wherein the intimately mixed oxide is selected from the group consisting of a co-formed mixed oxide, a praseodymia-impregnated bulk ceria mixed oxide, a sintered mixed oxide and mixtures thereof.

18. The catalyst member of claim 17 comprising a praseodymia-impregnated bulk ceria mixed oxide having an atomic ratio of Pr:Ce in the range of about 2:100 to 15:100.

19. The catalyst member of claim 16, claim 17 or claim 18 wherein the first catalytic metal component comprises a platinum group metal component.

20. The catalyst member of claim 16, claim 17 or claim 18 wherein the oxygen storage component comprises at least about 5% by weight of the combined weight of the oxygen storage component and the first catalytic material.

21. The catalyst member of claim 16 or claim 17 wherein the intimately mixed oxide has an atomic ratio of Pr:Ce in the range of about 15:100 to 100:100.

22. The catalyst member of claim 16, claim 17 or claim 18 wherein the oxygen storage component further comprises at least one additional rare earth metal oxide other than $CeO_2$ and $PrO_2$.

23. The catalyst member of claim 22 wherein the additional rare earth metal oxide comprises not more than about 20% by weight of the combined weight of the additional rare earth metal oxide and the oxygen storage component.

24. The catalyst member of claim 22 wherein the additional rare earth metal oxide comprises neodymia.

* * * * *